(12) United States Patent
Okamoto (10) Patent No.: US 10,974,983 B2
(45) Date of Patent: Apr. 13, 2021

(54) MOLTEN GLASS STIRRING DEVICE AND METHOD FOR MANUFACTURING GLASS ARTICLE

(71) Applicant: NIPPON ELECTRIC GLASS CO., LTD., Otsu (JP)

(72) Inventor: Shusuke Okamoto, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 170 days.

(21) Appl. No.: 16/087,796

(22) PCT Filed: Feb. 22, 2017

(86) PCT No.: PCT/JP2017/006637
§ 371 (c)(1),
(2) Date: Sep. 24, 2018

(87) PCT Pub. No.: WO2017/169333
PCT Pub. Date: Oct. 5, 2017

(65) Prior Publication Data
US 2020/0172422 A1    Jun. 4, 2020

(30) Foreign Application Priority Data
Mar. 29, 2016    (JP) .............................. JP2016-066428

(51) Int. Cl.
*C03B 5/187*    (2006.01)
*C03B 17/06*    (2006.01)

(52) U.S. Cl.
CPC .............. *C03B 5/187* (2013.01); *C03B 17/06* (2013.01)

(58) Field of Classification Search
CPC ............................... C03B 5/187; C03B 5/1875
See application file for complete search history.

(56) References Cited

U.S. PATENT DOCUMENTS

| 8,726,696 B2 | 5/2014 | Yamamoto et al. |
| 2012/0073326 A1* | 3/2012 | Dorfeld .................... C03B 5/16 65/27 |

(Continued)

FOREIGN PATENT DOCUMENTS

| CN | 20239034 U | 8/2012 |
| CN | 202390304 U | 8/2012 |

(Continued)

OTHER PUBLICATIONS

JPH0529546A Google Machine Translation Performed Jun. 5, 2020. (Year: 2020).*

(Continued)

*Primary Examiner* — Lisa L Herring
(74) *Attorney, Agent, or Firm* — Proskauer Rose LLP (57) ABSTRACT

A molten glass stirring device is provided that includes a container having an inlet through which molten glass flows in and an outlet through which molten glass flows out and a stirring mechanism having a vertically extending rotational shaft and an impeller provided on the rotational shaft to stir molten glass in the container. The molten glass stirring device further includes at least one of a first variable mechanism capable of adjusting the spacing between the impeller in the molten glass and the inner surface of the container by changing the horizontal position of the rotational shaft and a second variable mechanism capable of adjusting the spacing between the impeller in the molten glass and the surface of the molten glass by changing the vertical position of the rotational shaft.

1 Claim, 4 Drawing Sheets

(56) References Cited

U.S. PATENT DOCUMENTS

| | | | |
|---|---|---|---|
| 2012/0180529 A1* | 7/2012 | Singer | B01F 7/00425 65/135.3 |
| 2013/0101982 A1* | 4/2013 | Goodwin | B01F 15/00253 435/3 |
| 2018/0334404 A1* | 11/2018 | Schollmayer | B01F 7/00433 |

FOREIGN PATENT DOCUMENTS

| | | | | |
|---|---|---|---|---|
| JP | S64-69529 A | | 3/1989 | |
| JP | 0529546 A | * | 11/1993 | G06Q 30/0613 |
| JP | 2002-145626 A | | 5/2002 | |
| JP | 2008184375 A | | 8/2008 | |
| JP | 2012111685 A | | 6/2012 | |
| JP | 2013-502362 A | | 1/2013 | |
| WO | 2012/060372 A1 | | 5/2012 | |

OTHER PUBLICATIONS

JP2002-145262A Google Machine Translation Performed Jun. 5, 2020. (Year: 2020).*

Nakamura; English Translation of the International Preliminary Report on Patentability for International Application No. PCT/JP2017/006637; Japan Patent Office; dated Oct. 2, 2018; 6 pages.

Nippon Electric Glass Company, First Office Action for for Chinese Publication No. 201780019341.5; Chinese Intellectual Property Office; dated Aug. 13, 2020.

Notice of Reasons for Refusal, Japanese Patent Application No. 2018-508593, dated Feb. 3, 2021.

* cited by examiner

MOLTEN GLASS STIRRING DEVICE AND METHOD FOR MANUFACTURING GLASS ARTICLE

TECHNICAL FIELD

The present invention relates to a molten glass stirring device and a method for manufacturing a glass article.

BACKGROUND ART

A molten glass stirring device for stirring molten glass prepared in a melting furnace is used to manufacture a glass article (see Patent Document 1, for example). The molten glass stirring device includes a container having an inlet through which molten glass flows in and an outlet through which molten glass flows out and a stirring mechanism for stirring molten glass in the container. The stirring mechanism has a vertically extending rotational shaft and an impeller provided on the rotational shaft.

PRIOR ART DOCUMENT

Patent Document

Patent Document 1: International Publication No. WO 2012/060372

SUMMARY OF THE INVENTION

Problems that are to be Solved by the Invention

In a molten glass stirring device as described above, the position of the impeller is preset in view of, for example, the stirring efficiency of molten glass. However, in the thus arranged molten glass stirring device, the following phenomenon may occur.

The temperature of the container and/or an inflow pipe or an outflow pipe connected to the container in the molten glass stirring device changes over time at the beginning of and/or during glass production. That is, the container and/or the inflow pipe or the outflow pipe connected to the container may be displaced and/or deformed with temperature-dependent expansion or contraction. This causes the relative position between the container and the impeller and rotational shaft arranged therein to change partially or entirely. The above-described change in the relative position can cause a reduction in the homogeneity of molten glass, even if the vertical and horizontal positions of the impeller arranged in the container may be preset in view of the stirring efficiency of molten glass.

The present invention has been made in light of the above-described circumstances, and an object thereof is to provide a molten glass stirring device and a method for manufacturing a glass article with which a reduction in the homogeneity of molten glass can be suppressed easily.

Means for Solving the Problems

In order to solve the above-described problems and in accordance with one aspect of the present invention, a molten glass stirring device is provided that includes a container having an inlet through which molten glass flows in and an outlet through which molten glass flows out and a stirring mechanism having a vertically extending rotational shaft and an impeller provided on the rotational shaft to stir molten glass in the container, the molten glass stirring device further including at least one of a first variable mechanism capable of adjusting the spacing between the impeller in the molten glass and the inner surface of the container by changing the horizontal position of the rotational shaft and a second variable mechanism capable of adjusting the spacing between the impeller in the molten glass and the surface of the molten glass by changing the vertical position of the rotational shaft.

In accordance with the arrangement above, in a case where the relative position between the container and the impeller and rotational shaft arranged therein changes, at least one of the first variable mechanism and the second variable mechanism can change the position of the rotational shaft to provide a preferred relative position between the impeller in the molten glass and the container.

The above-described molten glass stirring device is preferably arranged such that the inlet and the outlet are provided in a side wall of the container, the molten glass stirring device includes the first variable mechanism, in which the first variable mechanism is configured to be capable of changing the horizontal position of the rotational shaft along at least one of a first direction in which an inflow pipe connected to the inlet extends and a second direction in which an outflow pipe connected to the outlet extends when viewed in the axial direction of the rotational shaft.

Here, in a case where the inlet and the outlet for molten glass are thus provided in the side wall of the container and the inflow pipe and the outflow pipe are thus connected, respectively, to the inlet and the outlet, the container is easily movable in the direction in which the inflow pipe or the outflow pipe extends with expansion or contraction of the inflow pipe or the outflow pipe. In accordance with the arrangement above, the first variable mechanism can change the position of the rotational shaft along at least one of the above-described first direction and the above-described second direction, and it is therefore possible to provide a more preferred relative position between the impeller in the molten glass and the inner surface of the container.

The molten glass stirring device may be arranged such that the inlet and the outlet are opposed to each other when viewed in the axial direction of the rotational shaft and the first direction and the second direction are positioned on the same straight line.

Here, in a case where the first direction and the second direction are thus positioned on the same straight line, the container is relatively largely movable along the straight line. The first variable mechanism is particularly advantageous with the thus arranged container.

The molten glass stirring device may be arranged such that the container is a bottomed cylindrical platinum or platinum alloy member with an internal space of an approximately circular or elliptical shape in horizontal cross-section and the inflow pipe and the outflow pipe are platinum or platinum alloy members.

It is, for example, possible to provide a preferred relative position between the container to which the thus arranged inflow pipe and outflow pipe are connected and the impeller as well as the rotational shaft.

The above-described molten glass stirring device is preferably arranged such that the stirring mechanism includes a support for supporting the rotational shaft in a cantilevered manner.

For example, in a case where an arch-like support arranged in a manner crossing over the container supports the rotational shaft, it could be difficult to ensure spaces lateral to and/or over the container. In accordance with the arrangement above, it is easy to ensure a space for installation of the molten glass stirring device.

The above-described molten glass stirring device is preferably arranged such that at least one of the first variable mechanism and the second variable mechanism includes a drive section for changing the position of the rotational shaft, a control section for controlling the drive section, and a detection section for detecting at least one of information on the molten glass and information on a glass article obtained from the molten glass, in which the control section controls the drive section based on detection results detected by the detection section.

In accordance with the arrangement above, it is possible to automate the operation of at least one of the first variable mechanism and the second variable mechanism.

In order to solve the above-described problems and in accordance with another aspect of the present invention, a method for manufacturing a glass article is provided that uses a container having an inlet through which molten glass flows in and an outlet through which molten glass flows out and a stirring mechanism having a vertically extending rotational shaft and an impeller provided on the rotational shaft to stir molten glass in the container. The method includes at least one of a horizontal position adjusting step of adjusting the spacing between the impeller in the molten glass and the inner surface of the container by changing the horizontal position of the rotational shaft and a vertical position adjusting step of adjusting the spacing between the impeller in the molten glass and the surface of the molten glass by changing the vertical position of the rotational shaft.

In accordance with the method above, in a case where the relative position between the container and the impeller and rotational shaft arranged therein changes, at least one of the horizontal position adjusting step and the vertical position adjusting step can change the position of the rotational shaft to provide a preferred relative position between the impeller in the molten glass and the container.

Effect of the Invention

The present invention succeeds in easily suppressing a reduction in the homogeneity of molten glass.

MODES FOR CARRYING OUT THE INVENTION

A molten glass stirring device and a method for manufacturing a glass article according to one embodiment will hereinafter be described with reference to the accompanying drawings.

<Overall Configuration of Molten Glass Stirring Device>

Figure 1:
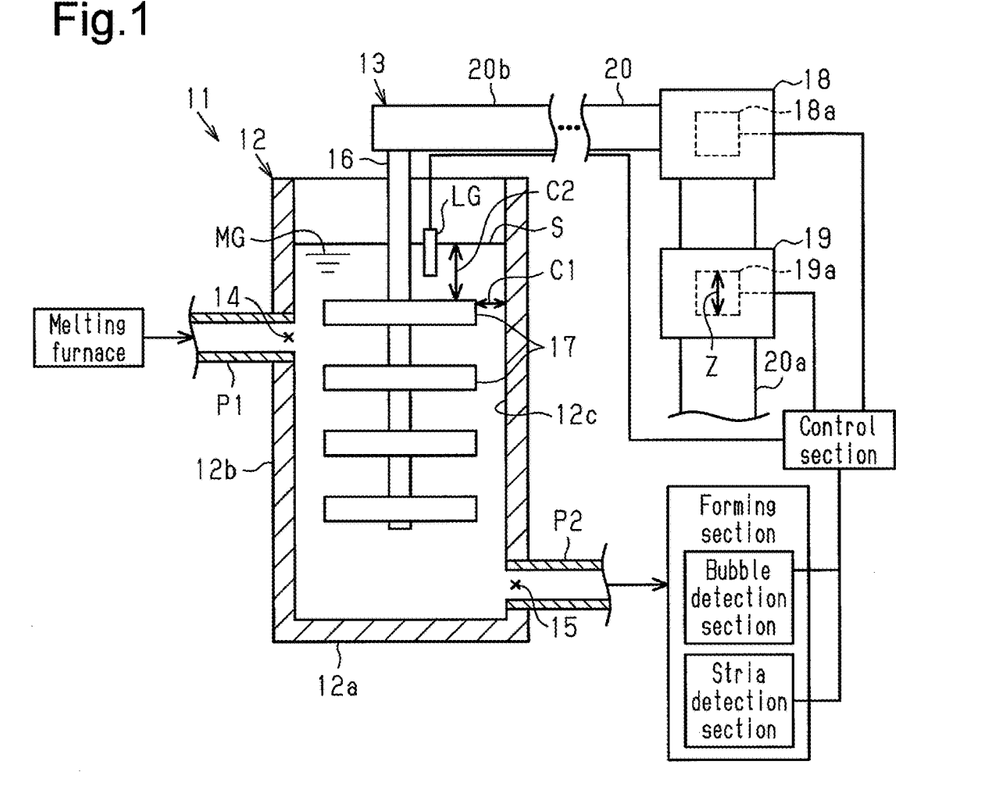
FIG. 1 is an illustrative view illustrating a molten glass stirring device according to one embodiment.

As shown in FIG. 1, a molten glass stirring device 11 includes a container 12 and a stirring mechanism 13 for stirring molten glass MG in the container 12. The container 12 has an inlet 14 through which molten glass MG flows in and an outlet 15 through which molten glass MG flows out. The stirring mechanism 13 has a vertically extending rotational shaft 16 and an impeller 17 provided on the rotational shaft 16. The molten glass stirring device 11 further includes a first variable mechanism 18 for changing the horizontal position of the rotational shaft 16 and a second variable mechanism 19 for changing the vertical position of the rotational shaft 16. Portions of the molten glass stirring device 11 in contact with molten glass MG and pipes connected to the container 12 of the molten glass stirring device 11 are each composed of a metal member (e.g. platinum or platinum alloy member) resistant to the heat from molten glass MG.

<Container>

The container 12 is a bottomed cylindrical member with an internal space of an approximately circular or elliptical shape in horizontal cross-section, including a bottom wall 12a and a side wall 12b provided in a manner standing on the bottom wall 12a. The above-described inlet 14 and the outlet 15 are provided in the side wall 12b of the container 12. The inlet 14 and the outlet 15 are provided at positions opposed to each other when viewed in the axial direction of the rotational shaft 16 of the stirring mechanism 13. That is, the inlet 14 and the outlet 15 are provided on opposite sides of the vertically extending center line of the container 12. An inflow pipe P1 is connected to the inlet 14 and an outflow pipe P2 is connected to the outlet 15. Both the inflow pipe P1 and the outflow pipe P2 extend in a direction orthogonal to the rotational shaft 16, that is, in the horizontal direction. The container 12 may include a lid or have a different shape as appropriate.

<Stirring Mechanism>

The stirring mechanism 13 includes a support 20 for supporting the rotational shaft 16 in a cantilevered manner. The support 20 includes a support body 20a fixed at a position adjacent to the molten glass stirring device 11 and extending in the vertical direction and a support arm 20b extending in the horizontal direction from the support body 20a. The stirring mechanism 13 includes a motor (not shown) for rotationally driving the rotational shaft 16. It is noted that the shape and the number of impellers 17 are not particularly limited but may be selected for use according to the viscosity of the molten glass MG, for example.

<Variable Mechanisms>

The first variable mechanism 18 is configured to be capable of adjusting a spacing C1 between the impeller 17 in the molten glass MG and an inner surface 12c of the container 12 by changing the horizontal position of the rotational shaft 16 of the stirring mechanism 13. The first variable mechanism 18 includes a first drive section 18a for changing the horizontal position of the rotational shaft 16 of the stirring mechanism 13.

The second variable mechanism 19 is configured to be capable of adjusting a spacing C2 between the impeller 17 in the molten glass MG and a surface S of the molten glass MG by changing the vertical position of the rotational shaft 16 of the stirring mechanism 13. The second variable mechanism 19 includes a second drive section 19a for changing the vertical position of the rotational shaft 16 of the stirring mechanism 13.

In more detail, the first variable mechanism 18 is a mechanism for moving the support arm 20b of the support 20 of the stirring mechanism 13 along the horizontal direction X (indicated by the arrow in FIG. 2) and adjusting the horizontal position of the support arm 20b to a predetermined position. The second variable mechanism 19 is a mechanism for elongating and contracting the support body 20a of the support 20 of the stirring mechanism 13 along the vertical direction Z (indicated by the arrow in FIG. 1) and adjusting the vertical position of the support body 20a to a predetermined position. It is noted that the second variable mechanism 19 may be, for example, a mechanism for moving the support arm 20b relative to the support body 20a in the vertical direction Z and adjusting the vertical position of the support arm 20b to a predetermined position.

The first drive section 18a of the first variable mechanism 18 and the second drive section 19a of the second variable mechanism 19 may each have an arrangement including, for example, a fluid pressure cylinder, such as a hydraulic cylinder or an air cylinder, or a gear train, such as a worm gear.

Figure 2:
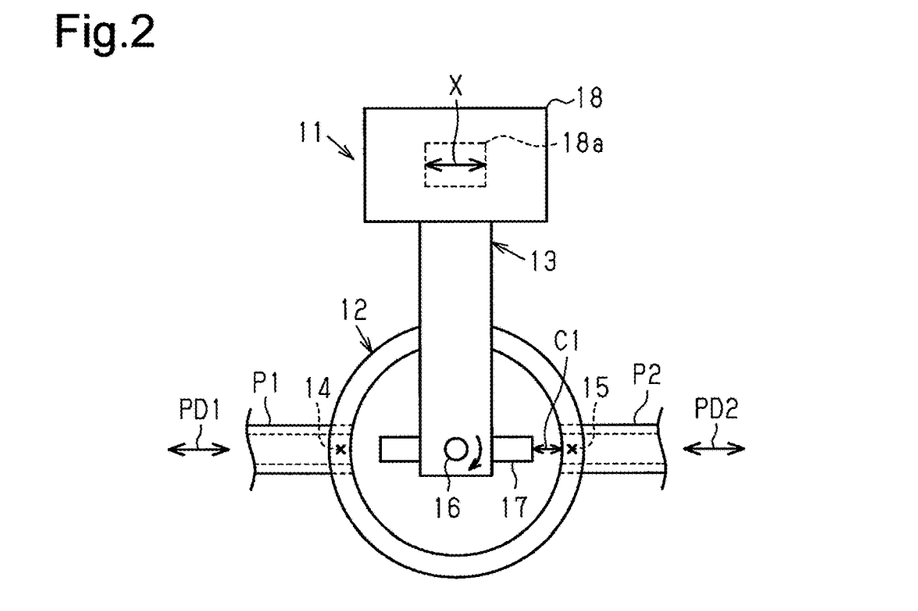
FIG. 2 is a schematic view of the molten glass stirring device when viewed in the axial direction of a rotational shaft.

As shown in FIG. 2, the first variable mechanism 18 of the present embodiment is configured to change the horizontal position of the rotational shaft 16 along a first direction PD1 in which the inflow pipe P1 connected to the inlet 14 extends when viewed in the axial direction of the rotational shaft 16. The first variable mechanism 18 is also configured to change the horizontal position of the rotational shaft 16 along a second direction PD2 in which the outflow pipe P2 connected to the outlet 15 extends when viewed in the axial direction of the rotational shaft 16. In the present embodiment, the first direction PD1 in which the inflow pipe P1 connected to the inlet 14 extends and the second direction PD2 in which the outflow pipe P2 connected to the outlet 15 extends are positioned on the same straight line. That is, the first direction PD1 and the second direction PD2 are coincident. It is noted that the support 20 of the stirring mechanism 13 in FIG. 1 is shown at a position different from the actual position shown in FIG. 2 for the purpose of illustration.

<Control>

As shown in FIG. 1, the molten glass stirring device 11 further includes a control section for controlling the first drive section 18a of the first variable mechanism 18 and the second drive section 19a of the second variable mechanism 19. The molten glass stirring device 11 further includes a detection section for detecting at least one of information on the molten glass MG and information on a glass article obtained from the molten glass MG.

The control section of the molten glass stirring device 11 acquires detection results from the detection section and, for example, based on a predefined threshold value, controls the first drive section 18a of the first variable mechanism 18 and the second drive section 19a of the second variable mechanism 19. The information on the molten glass MG detected by the detection section may include, for example, the viscosity of the molten glass MG, the temperature of the molten glass MG, and the level of the surface S of the molten glass MG in the container 12. The information on the glass article detected by the detection section may include, for example, bubbles in the glass article and striae in the glass article. FIG. 1 shows a bubble detection section, a stria detection section, and a level gauge LG for the molten glass MG as examples of the detection section. For example, a well-known imaging device and/or an optical sensor may be used as detection sections for detecting bubbles or striae in the glass article.

For example, in a case where bubbles are detected by the bubble detection section or in a case where striae are detected by the stria detection section, the control section controls the first drive section 18a to change the horizontal position of the rotational shaft 16 of the stirring mechanism 13 to a predetermined position. In a case where a predetermined surface level is detected by the level gauge LG for the molten glass MG, the control section controls the second drive section 19a to change the vertical position of the rotational shaft 16 of the stirring mechanism 13 to a predetermined position.

<Melting Furnace and Forming Section>

The molten glass stirring device 11 forms part of a glass article manufacturing equipment. The glass article manufacturing equipment includes a melting furnace, the molten glass stirring device 11, and a forming section. The inflow pipe P1 connected to the container 12 of the molten glass stirring device 11 transfers molten glass MG prepared in the melting furnace therethrough into the container 12 of the molten glass stirring device 11. The path for transferring molten glass MG therethrough between the melting furnace and the container 12 of the molten glass stirring device 11 can be provided with a clarifying tank or the like as appropriate. The outflow pipe P2 connected to the container 12 of the molten glass stirring device 11 transfers molten glass MG stirred in the container 12 of the molten glass stirring device 11 toward the forming section. The path for transferring molten glass MG therethrough between the container 12 of the molten glass stirring device 11 and the forming section can be provided with a stirring device having a configuration similar to or different from that of the molten glass stirring device 11 as appropriate.

The forming section can be selected based on a forming method according to the type of a glass article. The forming method may include, for example, a roll-out process, an up-draw process, a float process, and a down-draw process (a slot down-draw process or an overflow down-draw process). The glass article formed in the forming section is not particularly limited but may be, for example, a glass sheet and a glass tube. The molten glass stirring device 11 of the present embodiment is preferable as, for example, a molten glass stirring device 11 for forming a glass sheet, and more preferable as a molten glass stirring device 11 for forming a glass sheet through a down-draw process. The application of a glass sheet may include, for example, displays, touch panels, photoelectric conversion panels, electronic devices, window glasses, building materials, and vehicles.

<Method for Manufacturing Glass Article>

In a method for manufacturing a glass article, the above-described molten glass stirring device 11 is used. The method for manufacturing a glass article includes at least one of a horizontal position adjusting step and a vertical position adjusting step. The horizontal position adjusting step adjusts the spacing C1 between the impeller 17 in the molten glass MG and the inner surface 12c of the container 12 by changing the horizontal position of the rotational shaft 16 of the stirring mechanism 13. The vertical position adjusting step adjusts the spacing C2 between the impeller 17 in the molten glass MG and the surface S of the molten glass MG by changing the vertical position of the rotational shaft 16 of the stirring mechanism 13. In the method for manufacturing a glass article, at least one of the horizontal position adjusting step and the vertical position adjusting step may be performed one time or several times.

<Operations>

Major operations of the molten glass stirring device 11 and the method for manufacturing a glass article will be described.

Figure 3:
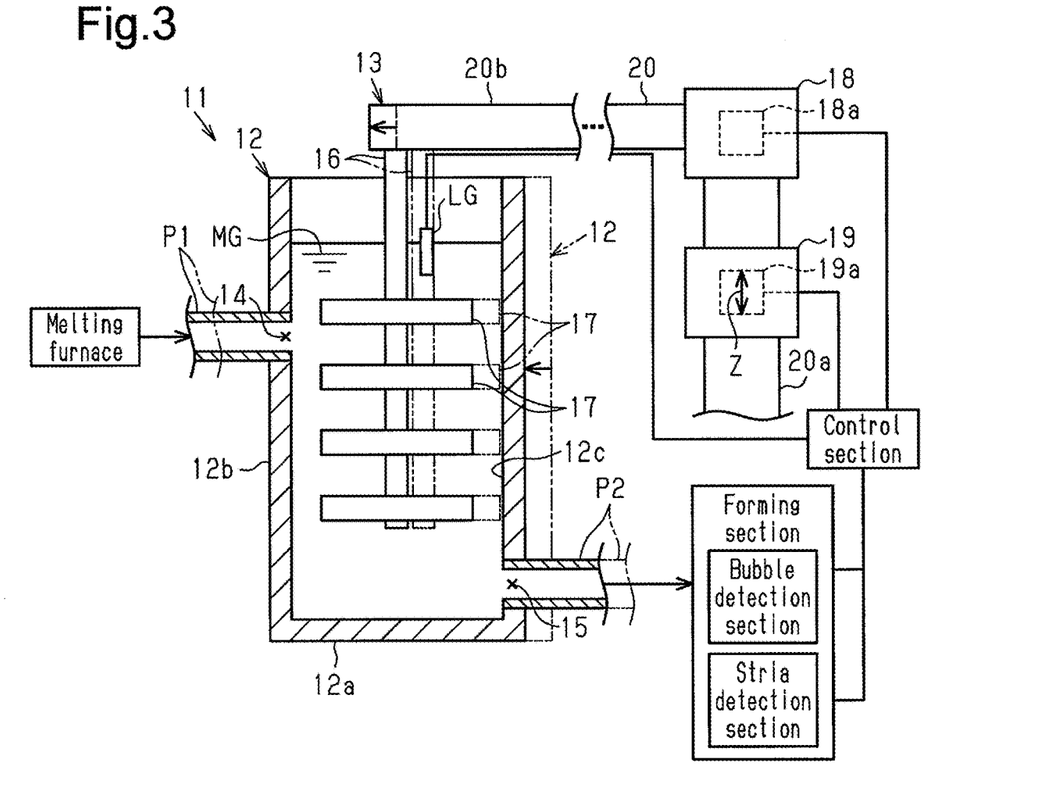
FIG. 3 is an illustrative view illustrating an example of the operation of a first variable mechanism.
Figure 4:
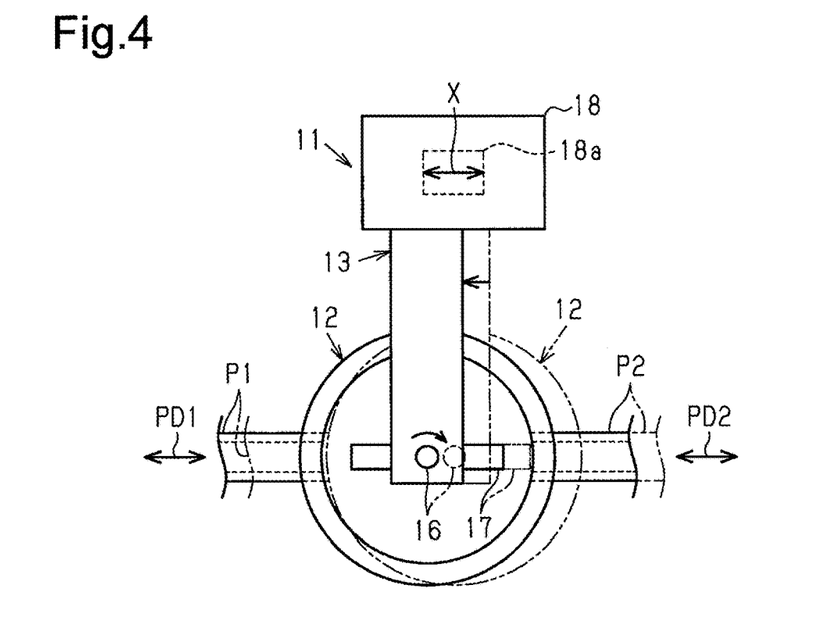
FIG. 4 is an illustrative view illustrating an example of the operation of the first variable mechanism.

FIGS. 3 and 4 show a case where the container 12 of the molten glass stirring device 11 moves horizontally from the position indicated by the alternate long and two short dashed line to the position indicated by the solid line. In this case, the first variable mechanism 18 in the molten glass stirring device 11 can adjust the spacing C1 between the impeller 17 in the molten glass MG and the inner surface 12c of the container 12 by changing the horizontal position of the rotational shaft 16 (the horizontal position of the impeller 17) from the position indicated by the alternate long and two short dashed line to the position indicated by the solid line. It is thereby possible to provide a preferred relative position between the impeller 17 in the molten glass MG and the inner surface 12c of the container 12.

Figure 5:
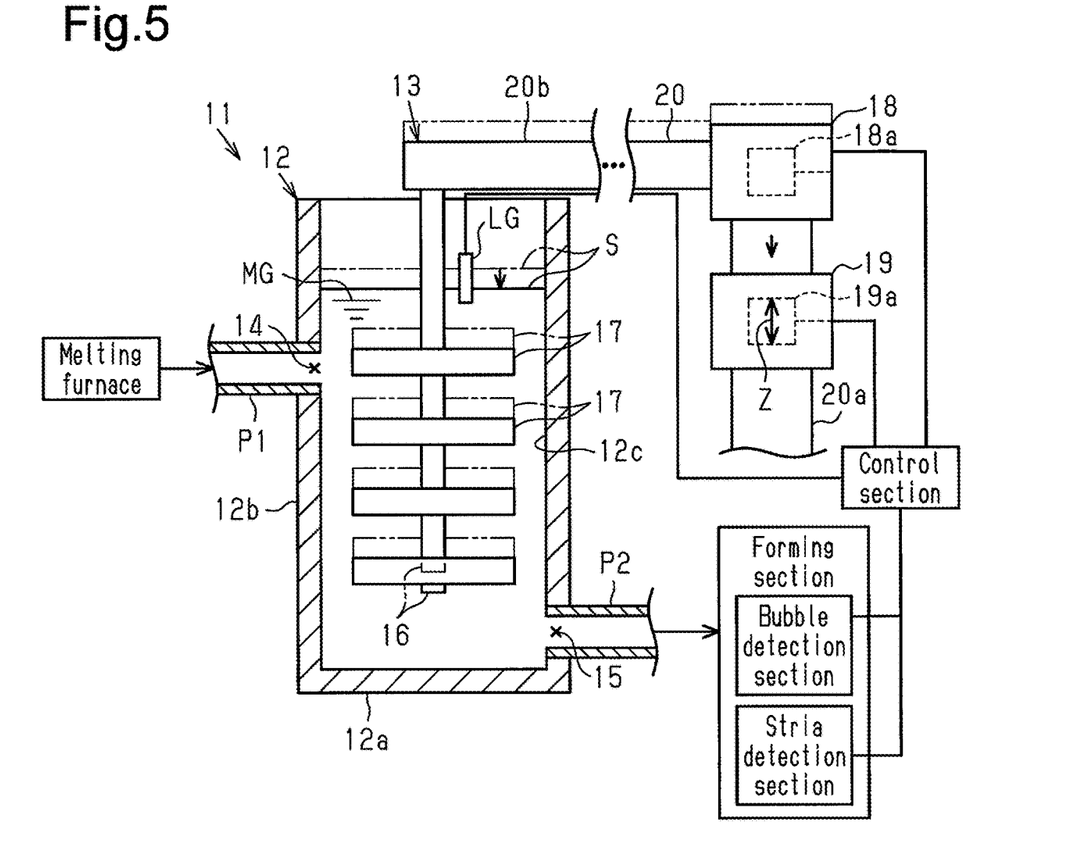
FIG. 5 is an illustrative view illustrating an example of the operation of a second variable mechanism.

FIG. 5 shows a case where the surface S of the molten glass MG in the container 12 of the molten glass stirring device 11 changes from the position indicated by the alternate long and two short dashed line to the position indicated by the solid line. In this case, the second variable mechanism 19 in the molten glass stirring device 11 can adjust the spacing C2 between the impeller 17 in the molten glass MG and the surface S of the molten glass MG by changing the vertical position of the rotational shaft 16 (the vertical position of the impeller 17) from the position indicated by the alternate long and two short dashed line to the position indicated by the solid line. It is thereby possible to provide a preferred relative position between the impeller 17 in the molten glass MG and the surface S of the molten glass MG (the upper end of the container 12).

In the method for manufacturing a glass article, in a case where the relative position between the impeller 17 arranged in the container 12 and the inner surface 12c of the container 12 changes, the horizontal position adjusting step can change the horizontal position of the rotational shaft 16 to adjust the spacing C1 between the impeller 17 in the molten glass MG and the inner surface 12c of the container 12. It is thereby possible to provide a preferred relative position between the impeller 17 in the molten glass MG and the inner surface 12c of the container 12.

In the method for manufacturing a glass article, in a case where the relative position between the impeller 17 arranged in the container 12 and the surface S of the molten glass MG changes, the vertical position adjusting step can change the vertical position of the rotational shaft 16 to adjust the spacing C2 between the impeller 17 in the molten glass MG and the surface S of the molten glass MG. It is thereby possible to provide a preferred relative position between the impeller 17 in the molten glass MG and the surface S of the molten glass MG (the upper end of the container 12).

The above-detailed embodiment exhibits the following operations and effects.

(1) The molten glass stirring device 11 includes the container 12 and the stirring mechanism 13 for stirring molten glass MG in the container 12. The container 12 has the inlet 14 through which molten glass MG flows in and the outlet 15 through which molten glass MG flows out. The stirring mechanism 13 has the rotational shaft 16 extending in the vertical direction Z and the impeller 17 provided on the rotational shaft 16. The molten glass stirring device 11 includes the first variable mechanism 18 and the second variable mechanism 19. The first variable mechanism 18 is configured to be capable of adjusting the spacing C1 between the impeller 17 in the molten glass MG and the inner surface 12c of the container 12 by changing the horizontal position of the rotational shaft 16 of the stirring mechanism 13. The second variable mechanism 19 is configured to be capable of adjusting the spacing C2 between the impeller 17 in the molten glass MG and the surface S of the molten glass MG by changing the vertical position of the rotational shaft 16.

In accordance with the arrangement above, in a case where the relative position between the container 12 and the impeller 17 and rotational shaft 16 arranged therein changes, at least one of the first variable mechanism 18 and the second variable mechanism 19 can change the position of the rotational shaft 16 to provide a preferred relative position between the impeller 17 in the molten glass MG and the container 12. This makes it easy to suppress a reduction in the homogeneity of the molten glass MG.

(2) The first variable mechanism 18 of the molten glass stirring device 11 of the present embodiment is configured to be capable of changing the horizontal position of the rotational shaft 16 along a first direction PD1 in which the inflow pipe P1 connected to the inlet 14 extends when viewed in the axial direction of the rotational shaft 16. In this case, the first variable mechanism 18 can change the position of the rotational shaft 16 along the first direction PD1 to provide a more preferred relative position between the impeller 17 in the molten glass MG and the inner surface 12c of the container 12. This makes it easier to suppress a reduction in the homogeneity of the molten glass MG. It is noted that the first variable mechanism 18 of the present embodiment is configured to be capable of changing the horizontal position of the rotational shaft 16 along the second direction PD2 in which the outflow pipe P2 connected to the outlet 15 of the container 12 extends. This makes it easier to suppress a reduction in the homogeneity of the molten glass MG.

(3) In the molten glass stirring device 11 of the present embodiment, the inlet 14 and the outlet 15 of the container 12 are opposed to each other when viewed in the axial direction of the rotational shaft 16 and the first direction PD1 and the second direction PD2 are positioned on the same straight line. In a case where the first direction PD1 and the second direction PD2 are thus positioned on the same straight line, the container 12 is relatively largely movable along the straight line. The above-described first variable mechanism 18 is particularly advantageous with the thus arranged container 12.

(4) For example, in a case where an arch-like support arranged in a manner crossing over the container 12 supports the rotational shaft 16, it could be difficult to ensure spaces lateral to and/or over the container 12. The stirring mechanism 13 of the molten glass stirring device 11 of the present embodiment includes the support 20 for supporting the rotational shaft 16 in a cantilevered manner. In this case, it is easy to ensure a space for installation of the molten glass stirring device 11.

(5) In the molten glass stirring device 11 of the present embodiment, the first variable mechanism 18 and the second variable mechanism 19 include their respective drive sections for changing the position of the rotational shaft 16 and the control section for controlling the drive sections. The molten glass stirring device 11 also includes the detection section for detecting information on the molten glass MG and information on a glass article obtained from the molten glass MG. The control section of the molten glass stirring device 11 controls the drive sections based on detection results detected by the detection section. In this case, it is possible to automate the operation of the first variable mechanism 18 and the second variable mechanism 19. This makes it easier to suppress a reduction in the homogeneity of the molten glass MG.

(6) The method for manufacturing a glass article uses the container 12 having the inlet 14 through which molten glass MG flows in and the outlet 15 through which molten glass MG flows out and the stirring mechanism 13 for stirring molten glass MG in the container 12. The stirring mechanism 13 has the rotational shaft 16 extending in the vertical direction Z and the impeller 17 provided on the rotational shaft 16. The method for manufacturing a glass article includes at least one of the horizontal position adjusting step and the vertical position adjusting step. The horizontal position adjusting step adjusts the spacing C1 between the impeller 17 in the molten glass MG and the inner surface 12c of the container 12 by changing the horizontal position of the rotational shaft 16 of the stirring mechanism 13. The vertical position adjusting step adjusts the spacing C2 between the impeller 17 in the molten glass MG and the surface S of the molten glass MG by changing the vertical position of the rotational shaft 16 of the stirring mechanism 13. In accordance with the method above, in a case where the relative position between the container 12 and the impeller 17 and rotational shaft 16 arranged therein changes, at least one of the horizontal position adjusting step and the vertical position adjusting step can change the position of the rotational shaft 16 to provide a preferred relative position between the impeller 17 in the molten glass MG and the container 12. This makes it easy to suppress a reduction in the homogeneity of the molten glass MG.

(Modifications)

The above-described embodiment may be modified as follows. It is noted that while modifications to the molten glass stirring device 11 will hereinafter be described, the method for manufacturing a glass article may also be modified in a similar manner.

A modification may be made such that at least one of the first drive section 18a and the second drive section 19a of the molten glass stirring device 11 is driven manually. That is, it is possible to omit the detection section and the control section of the molten glass stirring device 11.

The support 20 of the stirring mechanism 13 of the molten glass stirring device 11 is not limited to a cantilevered configuration but may be changed to an arch-like support.

The inlet 14 and the outlet 15 of the container 12 of the molten glass stirring device 11 may be provided at positions not opposed to each other when viewed in the axial direction of the rotational shaft 16 of the stirring mechanism 13. For example, in the molten glass stirring device 11 shown in FIG. 6, the outlet 15 of the container 12 is not opposed to the inlet 14 when viewed in the axial direction of the rotational shaft 16 of the stirring mechanism 13, but is provided at a position spaced about 90 degrees from the inlet 14 around the center line of the container 12. Alternatively, the inlet 14 may be provided in an upper part of the container 12, for example.

Figure 6:
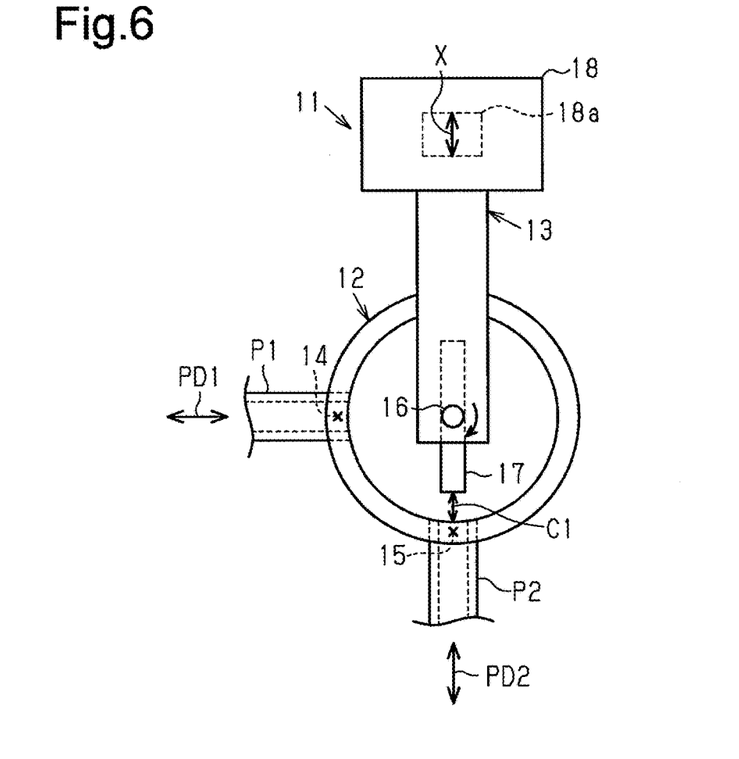
FIG. 6 is a schematic view showing a modification of the molten glass stirring device.
Figure 7:
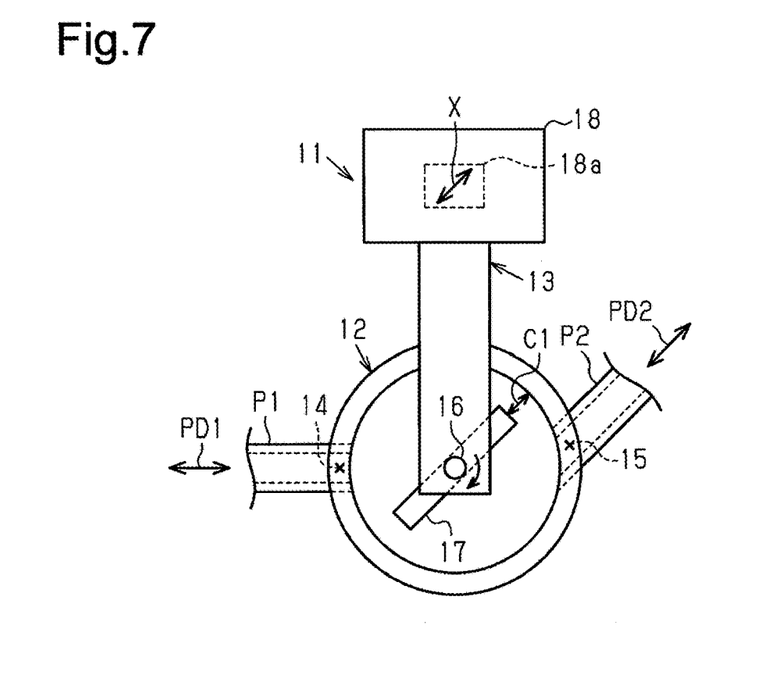
FIG. 7 is a schematic view showing a modification of the molten glass stirring device.

As shown in FIGS. 6 and 7, in the molten glass stirring device 11, the first direction PD1 in which the inflow pipe P1 connected to the inlet 14 of the container 12 extends and the second direction PD2 in which the outflow pipe P2 connected to the outlet 15 extends may be different directions. In this case, the first variable mechanism 18 of the molten glass stirring device 11 is preferably configured to be capable of changing and adjusting the spacing C1 between the impeller 17 in the molten glass MG and the inner surface 12c of the container 12 along at least one of the first direction PD1 and the second direction PD2. In the molten glass stirring device 11 shown in FIG. 6, the first direction PD1 in which the inflow pipe P1 extends and the second direction PD2 in which the outflow pipe P2 extends intersect at about 90 degrees in a plan view. In the molten glass stirring device 11 shown in FIG. 7, the first direction PD1 in which the inflow pipe P1 extends and the second direction PD2 in which the outflow pipe P2 extends intersect at about 45 degrees in a plan view. Both the first variable mechanism 18 of the molten glass stirring device 11 shown in FIG. 6 and the first variable mechanism 18 of the molten glass stirring device 11 shown in FIG. 7 are configured to change the horizontal position of the rotational shaft 16 along the second direction PD2. However, the first variable mechanism 18 of the molten glass stirring device 11 shown in FIG. 6 or the first variable mechanism 18 of the molten glass stirring device 11 shown in FIG. 7 may be configured to change the horizontal position of the rotational shaft 16 not along the second direction PD2 but along the first direction PD1 or may be configured to be capable of changing the horizontal position of the rotational shaft 16 not only along the second direction but also along the first direction PD1.

In the first variable mechanism 18 of the molten glass stirring device 11, the direction in which the horizontal position of the rotational shaft 16 of the stirring mechanism 13 changes is not limited to at least one of the first direction PD1 in which the inflow pipe P1 connected to the inlet 14 of the container 12 extends and the second direction PD2 in which the outflow pipe P2 connected to the outlet 15 extends. That is, in a case where a factor other than the inflow pipe P1 or the outflow pipe P2 described above changes the relative position between the impeller 17 of the stirring mechanism 13 and the inner surface 12c of the container 12 in a predetermined direction, a modification may be made such that the first variable mechanism changes the horizontal position of the rotational shaft 16 of the stirring mechanism 13 along that direction.

Multiple molten glass stirring devices 11 may be provided in the glass article manufacturing equipment. In this case, one stirring mechanism 13 is preferably provided correspondingly to each container 12, as in the molten glass stirring device 11 of the above-described embodiment.

The present invention is not limited to the exemplified disclosure. For example, the exemplified features should not be construed as essential to the present invention. Rather, the subject matter of the present invention may exist within fewer than all the features of the particular embodiment disclosed. The present invention is intended to be defined by the appended claims and encompass all modifications within the scope of equivalence to the appended claims.

DESCRIPTION OF REFERENCE CHARACTERS

11 . . . molten glass stirring device, 12 . . . container, 12b . . . side wall, 12c . . . inner surface, 13 . . . stirring mechanism, 14 . . . inlet, 15 . . . outlet, 16 . . . rotational shaft, 17 . . . impeller, 18 . . . first variable mechanism, 18a . . . first drive section, 19 . . . second variable mechanism, 19a . . . second drive section, 20 . . . support, MG . . . molten glass, C1, C2 . . . spacing, P1 . . . inflow pipe, PD1 . . . first direction, P2 . . . outflow pipe, PD2 . . . second direction, S . . . surface.

The invention claimed is:

1. A method for manufacturing a glass article, using:
   a container having an inlet through which molten glass flows in and an outlet through which molten glass flows out; and
   a stirring mechanism having a vertically extending rotational shaft and an impeller provided on the rotational shaft to stir molten glass in the container,
   the method comprising a vertical position adjusting step of adjusting a spacing between the impeller in the molten glass and a surface of the molten glass by changing a vertical position of the rotational shaft in a case where a relative position between the impeller in the molten glass and the surface of the molten glass changes and
   a horizontal position adjusting step of adjusting a spacing between the impeller in the molten glass and an inner surface of the container by changing a horizontal position of the rotational shaft in a case where a relative position between the impeller in the molten glass and the inner surface of the container changes, wherein
   the container is a bottomed cylindrical platinum or platinum alloy member with an internal space of an approximately circular or elliptical shape in horizontal cross-section, and the horizontal cross-section of the container is constant in the vertical direction.

* * * * *